June 1, 1965 L. H. MORIN 3,187,072
METHOD OF PRODUCING MULTIPLE INTERCAST PLASTIC PRODUCTS
Filed June 20, 1962
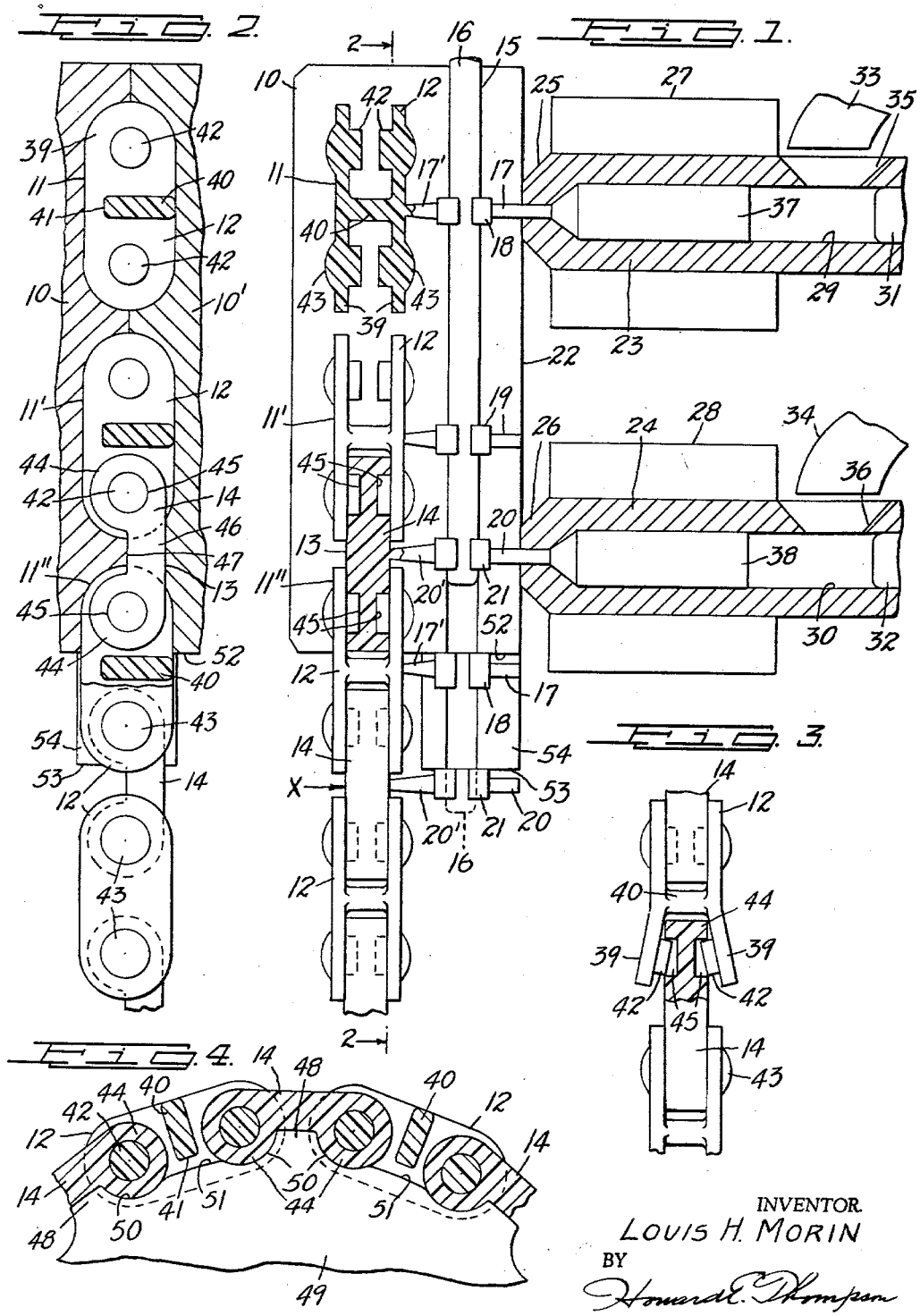
INVENTOR.
LOUIS H. MORIN
BY
Howard E. Thompson
ATTORNEY United States Patent Office 3,187,072
Patented June 1, 1965

3,187,072
METHOD OF PRODUCING MULTIPLE INTERCAST PLASTIC PRODUCTS
Louis H. Morin, 125 Beechwood Ave., Bronx, N.Y.
Filed June 20, 1962, Ser. No. 203,777
7 Claims. (Cl. 264—242)

This invention relates to the formation of plastic products, wherein at least two plastic elements of a high melting point plastics are united by a lower melting point plastic element in the assemblage of said elements or in the production of a multiplicity of such assemblages in production of a chain as the resulting end product. More particularly, the invention deals with a novel method of producing products of the character described, wherein the intercast or coupled elements are relatively movable one with respect to the other.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an enlarged face view of one die of a pair of dies, diagrammatically showing the elements cast or molded in the die, parts of the construction being shown in elevation and parts in section and diagrammatically outlining the heating means for the two injection cylinders employed.

FIG. 2 is a section, generally on the line 2—2 of FIG. 1 through the pair of dies and illustrating parts of the formed elements in section and elevation and omitting part of the background showing.

FIG. 3 is a diagrammatic view illustrating the method of joining ends of the chain product formed in production of an endless chain, part of the structure being shown in section; and FIG. 4 is a face view of part of a sprocket, in connection with which the chain can be used, the chain being shown in longitudinal section.

The method, as disclosed in part in this application, is in accordance with a method more specifically disclosed in a companion application, filed of equal date herewith.

In illustrating one adaptation and use of my invention of intercasting or joining several parts or elements of a resulting end product, I have illustrated the joining of two links of a chain with an intermediate coupling link, particularly in producing an end product wherein the engaged links are relatively movable in producing a resulting flexible chain structure.

In FIG. 2 of the drawing, I have shown at 10, 10' a sectional view of a pair of relatively movable and coupled dies, the face view of the die 10 being illustrated in FIG. 1. Adjacent surfaces of the dies are fashioned to form two similar cavities 11, 11' and a partial cavity 11'' for forming in the cavity 11 one link or element 12 of a chain which, in carrying out my method, is first positioned in the cavity 11' after its initial formation and then part of it is positioned in the cavity 11'', in the manner diagrammatically shown in FIG. 1. The dies also are fashioned to form a cavity 13 for molding of a second link or element 14 upon two of the elements 12 then positioned in the cavities 11', 11''. The dies are also fashioned to form an elongated cavity 15 for a transfer core 16. The dies also have passages for forming gate portions 17, 17' with an intermediate open collar portion 18 partially enveloping the core 16 and passages, as at 19, for reception of 17, 17' and 18 when the cast element 12 is in the cavity or at the station designated by the reference character 11'. The dies also have cavities or passages for forming gates 20, 20' joined by an open ring 21, which again partially envelopes the core 16.

Arranged upon and movable relatively to the surface 22 of the dies, as noted in FIG. 1, are two injection cylinders 23 and 24. The nozzle ends 25 and 26 thereof are brought into alignment with the passages forming the gates 17 and 20 in the casting or injection position of the cylinders and then moved on the surface 22 out of engagement or alinement with these passages in a manner known in this art and more specifically disclosed in the companion application referred to hereinbefore. Mounted on the nozzle end portions of the cylinders 23 and 24 are suitable heating elements, which are diagrammatically outlined at 27 and 28. As these elements are known in the art, there is no need for a clearer illustration thereof. Arranged and operating in the bores 29 and 30 of the cylinders 23 and 24 are the injection plungers, shown, in part, at 31 and 32 in FIG. 1, for advancing plastic crystals introduced into the bores 29 and 30 from pipes or tubes 33, 34 through apertures 35 and 36 in the cylinder forwardly of the plungers 31 and 32. Previously advanced and now at least partially heated plastics for forming the resulting cast or molded elements are diagrammatically illustrated at 37, 38 in the bores 29 and 30.

The cylinder 23 will receive crystals of one melting point plastic material heated by the appropriate heating element 27 to reduce the plastics to the state necessary for injection of the material into the cavity 11 in formation of the element 12. In contrast, the cylinder 24 will receive crystals of another plastic material, the melting point of which will be lower than the melting point of the material 37 and, again, the heating element 28 will be suitable for heating this material for injection into the cavity 13 in forming the element 14. While these plastic materials may vary in types and kinds, it is only essential that a differential in melting points be provided between the higher melting point plastic 37 and the lower melting point plastic 38, for purposes which will later be apparent. By way of illustration, the plastic material at 37 could be nylon, with a melting point of approximately 480° F., and the plastic material 38 could be Delrin, with a melting point of approximately 370° F., showing a temperature differential of 110° F. By maintaining this differential, the element 14 will not adhere to or fuse on the pre-cast elements 12 when positioned in the cavities or stations, as at 11' and 11''. Thus, in the resulting end product which, in the construction shown, is a chain, the elements 12 and 13 will be relatively movable in providing free flexibility, as required in a chain structure.

As above stated, the element 12 comprises a link of a chain. Considering FIGS. 1 and 2 of the drawing and other figures, it will appear that this link comprises two similar side plates 39 joined centrally in a rib or web 40, which terminates short of one side edge of the plates 39, as clearly noted at 41 in FIG. 2 of the drawing. Inner adjacent surfaces of the plates 39 have rounded pin or pivot portions 42. In order to reproduce common chain construction, outer surfaces of the plates 39 have rounded projecting portions 43, simulating heads of pivot pins commonly employed in conventional chains. However, when employed, they serve to reinforce and strengthen the pivot ends of the link or element 12. In forming the link or element 12 at the cavity or station 11, the gate part 17' is integral with the adjacent plate 39 of the resulting casting, as diagrammatically seen in FIG. 1.

The link 14 is generally of the contour shown in plan in FIG. 2 and comprises rounded ends 44, having apertures 45 in opposed sides thereof, note FIG. 1, for reception of the pin or pivot portions 42, the apertures 45 being formed by molding 14 on the elements 12 while at the stations 11′, 11″, as shown in the lower part of the die in FIG. 1 of the drawing, wherein the element 14 is shown in section. The central portion 46 of the element or link 14 integrally joins the rounded ends 44 and is disposed primarily at one-half side of the element or link 14, in other words, the surface 47 is disposed centrally with respect to the link. This is clearly noted at the lower portion of the die in FIG. 2 of the drawing.

The offset arrangement of the link 14 provides, between the rounded portions 44 and the surface 47, a recess for the reception of the tooth 48 of a sprocket 49, shown, in part, in FIG. 4 of the drawing. At each side of the tooth 48, the sprocket 49 has rounded recesses 50 for reception of the rounded portions 44 of the element or link 14, as clearly noted in FIG. 4 of the drawing. Between adjacent rounded surfaces 50, the sprocket has surfaces 51 spaced with respect to the surfaces 41 of the rib or webs 40. In the sectional showing of the chain in FIG. 4 of the drawing, the section has been taken through the pin or pivot portions of the elements or links 12.

In carrying out the method of producing the end product or chain as herein shown by way of illustration, in each cycle of operation of the machine, the cylinders or the nozzles 25 and 26 thereof, when brought into registering alinement with the recesses forming the gates 17 and 20 respectively, and the plungers 31 and 32 are actuated, a plastic material is injected simultaneously into the cavities 11 and 13 in forming the element 12 in 11 and the element 14 in 13, is being understood that, in previous cycles of operation, two of the elements 12 have been brought into registering position with the stations 11′, 11″, so that the element 14 is formed directly upon the two elements 12 then positioned at such stations. Thus, in each cycle of operation of the machine, two of the elements 12 are joined and united by the single element 14. After completion of one cycle of operation, the transfer core 16 is moved down into the dotted line position when the dies are open and this movement will result in moving the assemblage of the two elements 12 and the one element 13 into the position shown generally at X in FIG. 1 and, at the same time, the element 12, cast in the cavity or at the station 11, is moved into alinement with the station at 11′ and the element 12, which was in the station at 11′, will then assume the position in the station 11″; whereupon, the dies are substantially closed and the core 16 is returned to its full line position of FIG. 1, as a result of which, the open rings 18 and 21, constituting part of the gate structure, will be stripped from the core 16 by engagement of 18 with the lower surface 52 of the die proper; whereas, the open ring 21 will be stripped from the core 16 by engagement with a lower surface 53 of an extension 54 to the die structure, the open rings 18 and 21 facilitating this stripping operation.

In the showing of FIG. 1 of the drawing, the illustration at X, including the attached cores and rings 18, 21, would actually have been removed when the core 16 has again assumed its raised position, by virtue of the fact that pairs of trimming knives, not shown, will have actuated to remove the core portions 17′ and 20′ from elements 12 and 14 while at the position X and these trimmed gate portions will then be deposited into a suitable receptacle. In order to clearly illustrate the invention, the present showing has been made so that positioning of 18 and 21 with respect to 52 and 53 be illustrated.

The foregoing completes one cycle of operation. In other words, in each injection stroke of the plungers in the injection cylinders, one element 12 will be formed and one element 14 will be formed. At this time, it is also to be borne in mind that, in the above described stripping operation, the element 12, which has been positioned at the station 11′, will be retained at this station by the partially closed dies and the core 16 will move relatively to the gate structure 17, 17′ and 18 then positioned in the recesses, as at 19. In some instances, it might be desirable to first position the initially formed element 12 in a station intermediate the stations 11, 11′ for the purpose of expediting the cooling operation on the first cast element and, further, to enable the machine to be operated at a higher production rate, in the manner clearly brought out in the companion application referred to hereinbefore.

In accordance with the method as disclosed, substantially endless lengths of chains can be formed and chains of predetermined diameters can be produced by simply flexing the side walls 39 of an element or link 12 in disengaging an element or link 14 therefrom and in joining another link or element 14 with the flexed link 12, in a manner which is diagrammatically illustrated, in part, in FIG. 3 of the drawing. With many of the materials employed, and particularly such materials as nylon, a great degree of flexibility is provided to facilitate this coupling and uncoupling, as diagrammatically shown, the illustration in FIG. 3 being simply a partially flexed position.

As previously stated, the illustration in the accompanying drawing is to disclose one method of carrying my invention into effect in the production of one type of end product, wherein two elements are joined by a single element in producing what I term a multiple assemblage of elements and, in the present teaching, these multiple assembled elements are relatively movable, a structure which is desirable in producing a flexible chain. In producing this or any other end product, the different elements may be of a common color or the elements 12, for example, could be in a color contrasting to the elements 14.

In the showing in FIG. 2 of the drawing, it will be understood that the section on the line 2—2 gives the outline or contour of die cavities defining one of the walls 39 of the elements 12. It will be understood that the dies will have cavities to form the pin or pivot portions 42 shown in elevation in FIG. 2, cavities to form the rib or web 40 shown, in section, in FIG. 2, and a cavity in the die 10 to form one half of the rounded portions 44; whereas, the other half of the rounded portions 44, including the central portion 46, will be formed in the die 10′.

In the production of some end products, it will be understood that products can be produced of plastic materials of two or more different color combinations by assemblage of the element or elements of one color upon elements of another color in the production of predetermined end results in the finished product. In referring to several different colors, it will be apparent that another injection station, similar to 23 and 24, can be associated with the dies in performance of additional casting or molding operations upon a predetermined assemblage.

Having fully described my invention, what I claim as new and desire to secure by Letters Patent is:

1. The method of producing multiple intercast products, which comprises forming a first plastic element at one molding station, simultaneously forming another plastic element at another molding station spaced with respect to said first station, uniting the second named element with two of the first named elements while positioned at said second named casting station in coupling said two elements with said second named element, and forming the second named element of a plastic material having a melting point lower than the melting point in the plastic material of the first named element in providing free relative movement of the two first named elements on the second named element when coupled together.

2. The method of producing multiple intercast products, which comprises forming a first plastic element at one molding station, simultaneously forming another plastic element at another molding station spaced with respect to said first station, uniting the second named element with two of the first named elements while positioned at said second named casting station in coupling said two elements with said second named element, forming the second named element of a plastic material having a melting point lower than the melting point in the plastic material of the first named element in providing free relative movement of the two first named elements on the second named element when coupled together, forming at ends of the first named element pivot portions, and enveloping ends of the second named element on said pivot portion in pivotally coupling said elements.

3. The method of producing multiple intercast products, which comprises forming a first plastic element at one molding station, simultaneously forming another plastic element at another molding station spaced with respect to said first station, uniting the second named element with two of the first named elements while positioned at said second named casting station in coupling said two elements with said second named element, forming the second named element of a plastic material having a melting point lower than the melting point in the plastic material of the first named element in providing free relative movement of the two first named elements on the second named element when coupled together, forming the first named elements with side plates joined centrally in a connecting rib with pivot portions on inner surfaces of end portions of said plates, and forming at ends of the second element rounded portions enveloping the pivot portions at adjacent ends of adjacent pairs of first named elements.

4. The method of producing multiple intercast products, which comprises forming a first plastic element at one molding station, simultaneously forming another plastic element at another molding station spaced with respect to said first station, uniting the second named element with two of the first named elements while positioned at said second named casting station in coupling said two elements with said second named element, forming the second named element of a plastic material having a melting point lower than the melting point in the plastic material of the first named element in providing free relative movement of the two first named elements on the second named element when coupled together, forming the first named elements with side plates joined centrally in a connecting rib with pivot portions on inner surfaces of end portions of said plates, forming at ends of the second element rounded portions enveloping the pivot portions at adjacent ends of adjacent pairs of first named elements, and forming on outer surfaces of the side plates of said first named elements projecting portions in alinement with said pivot portions.

5. The method of producing multiple intercast products, which comprises forming a first plastic element at one molding station, simultaneously forming another plastic element at another molding station spaced with respect to said first station, uniting the second named element with two of the first named elements while positioned at said second named casting station in coupling said two elements with said second named element, forming, in conjunction with each element, gate portions, including open rings partially enveloping a transfer core, and utilizing said core to transfer the first element to an intermediate station partially exposed to the second casting station and in transferring a pair of the first named elements united by the second named element to a stripper and trimming station, preparatory to returning said transfer core to normal position, preparatory to receiving the next cycle of operation of the machine.

6. The method of producing multiple intercast products, which comprises forming a first plastic element at one molding station, simultaneously forming another plastic element at another molding station spaced with respect to said first station, uniting the second named element with two of the first named elements while positioned at said second named casting station in coupling said two elements with said second named element, forming the second named element of a plastic material having a melting point lower than the melting point in the plastic material of the first named element in providing free relative movement of the two first named elements on the second named element when coupled together, and utilizing a plastic material in forming the first named element having flexible characteristics facilitating coupling and uncoupling of one of said first named elements with a second named element in forming an endless product of predetermined dimensions.

7. The method of producing intercast links of a plastic chain, which comprises forming one link element having spaced side plates joined centrally in a rib with pivot portions on inner surfaces of end portions of said plates, joining pairs of side links with a connecting link having end portions encircling the pivot portions at adjacent ends of a pair of adjacent first named links, and forming the connecting links of a plastic material having a melting point lower than the melting point of the first named link element in providing free pivotal movement on the pair of link elements on said connecting link.

References Cited by the Examiner

UNITED STATES PATENTS

| | | | |
|---|---|---|---|
| 2,363,801 | 11/44 | Morin | 18—55 |
| 2,424,047 | 7/47 | Morin | 18—55 |
| 2,460,524 | 2/49 | Morin. | |
| 2,651,079 | 9/53 | Michaelson et al. | 264—261 |
| 2,780,150 | 2/57 | Yeoman | 264—261 |
| 2,819,494 | 1/58 | Morin | 264—242 |
| 2,829,402 | 4/58 | Morin | 264—242 |
| 2,915,909 | 12/59 | Boron | 74—245 |
| 3,000,049 | 9/61 | Terry | 264—328 |
| 3,054,300 | 9/62 | Bowman | 74—245 |

ALEXANDER H. BRODMERKEL, *Primary Examiner.*